United States Patent
Atarius et al.

(10) Patent No.: US 6,373,882 B1
(45) Date of Patent: Apr. 16, 2002

(54) MOTION ESTIMATOR FOR A CDMA MOBILE STATION

(75) Inventors: Roozbeh Atarius; Torsten Carlsson; Håkan Eriksson; Kjell Gustafsson; Torgny Palenius, all of Lund; Christer Östberg, Staffanstorp, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/187,002

(22) Filed: Nov. 6, 1998

(51) Int. Cl.[7] .......................... H04B 15/00; H04K 1/00; H04L 27/30
(52) U.S. Cl. .................. 375/148; 375/144; 375/349
(58) Field of Search .................. 375/148, 144, 375/134, 137, 260, 267, 349, 347; 455/277.1, 277.2, 132

(56) References Cited

U.S. PATENT DOCUMENTS

| | | |
|---|---|---|
| 4,971,266 A | 11/1990 | Mehltretter et al. |
| 5,109,390 A | 4/1992 | Gilhousen et al. ........... 370/335 |
| 5,311,143 A | 5/1994 | Soliday ..................... 330/127 |
| 5,490,165 A | 2/1996 | Blakeney II ................ 375/148 |
| 5,703,595 A | 12/1997 | Tayloe et al. |
| 5,903,596 A | 5/1999 | Nakano ..................... 375/150 |
| 5,978,423 A | 11/1999 | Farjh ....................... 375/347 |
| 6,249,539 B1 | 6/2001 | Harms et al. ............... 375/134 |
| 6,249,682 B1 | 6/2001 | Kubo et al. ................ 375/130 |

FOREIGN PATENT DOCUMENTS

| | | |
|---|---|---|
| EP | 0849887 A2 | 6/1998 |
| GB | 2268365 A | 1/1994 |

OTHER PUBLICATIONS

Akbar Sayeed, et al., "Joint Multipath–Doppler Diversity in Fast Fading Channels," ICASSP 1998, Proceedings, vol. 6, May 15, 1998, pp. 3237–3240.

*Primary Examiner*—Chi Pham
*Assistant Examiner*—Phuong Phu
(74) *Attorney, Agent, or Firm*—Burns, Doane, Swecker & Mathis, L.L.P.

(57) ABSTRACT

The present invention provides a system and method for reducing the power consumed by a RAKE receiver. In exemplary embodiments of the present invention, an environment variation estimator is implemented in a CDMA mobile station. The environment variation estimator is connected to the searcher of the RAKE receiver and provides an estimate of the rate at which the mobile station's environment is changing. By providing an estimate of the rate of change of the mobile station's environment, the duty cycle of the searcher can be optimized, thereby reducing the overall power consumed by the receiver. By also providing the estimate to the RAKE fingers, channel tracking can be improved.

27 Claims, 4 Drawing Sheets

MOTION ESTIMATOR FOR A CDMA MOBILE STATION

BACKGROUND

The present invention relates generally to the use of Code Division Multiple Access (CDMA) communication techniques in a radio communication system and, more particularly, to receivers which demodulate CDMA signals.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing next generation technology. Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure. An important feature desired in these new systems is increased traffic capacity.

Currently, channel access is achieved using Frequency Division Multiple Access (FDMA) and Time Division Multiple Access (TDMA) methods. In FDMA, a communication channel is a single radio frequency band into which a signal's transmission power is concentrated. Signals which can interfere with a communication channel include those transmitted on adjacent channels (adjacent channel interference) and those transmitted on the same channel in other cells (co-channel interference). Interference with adjacent channels is limited by the use of band pass filters which only pass signal energy within the specified frequency band. Co-channel interference is reduced to tolerable levels by restricting channel re-use by providing a minimum separation distance between cells in which the same frequency channel is used. Thus, with each channel being assigned a different frequency, system capacity is limited by the available frequencies as well as by limitations imposed by channel reuse.

In TDMA systems, a channel consists of, for example, a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, with each channel being assigned a different time slot, system capacity is limited by the available time slots as well as by limitations imposed by channel reuse as described above with respect to FDMA.

With FDMA and TDMA systems (as well as hybrid FDMA/TDMA systems), one goal of system designers is to ensure that two potentially interfering signals do not occupy the same frequency at the same time. In contrast, Code Division Multiple Access (CDMA) is a channel access technique which allows signals to overlap in both time and frequency. CDMA is a type of spread spectrum communications, which has been around since the days of World War II. Early applications were predominantly military oriented. However, today there has been an increasing interest in using spread spectrum systems in commercial applications since spread spectrum communications provide robustness against interference, which allows for multiple signals to occupy the same bandwidth at the same time. Examples of such commercial applications include digital cellular radio, land mobile radio, and indoor and outdoor personal communication networks.

In a CDMA system, each signal is transmitted using spread spectrum techniques. In principle, the informational data stream to be transmitted is impressed upon a much higher rate data stream known as a signature sequence. Typically, the signature sequence data are binary, providing a bit stream. One way to generate this signature sequence is with a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

A plurality of spread information signals modulate a radio frequency carrier, for example by binary phase shift keying (BPSK), and are jointly received as a composite signal at the receiver. Each of the spread signals overlaps all of the other spread signals, as well as noise-related signals, in both frequency and time. If the receiver is authorized, then the composite signal is correlated with one of the unique signature sequences, and the corresponding information signal can be isolated and despread. If quadrature phase shift keying (QPSK) modulation is used, then the signature sequence may consist of complex numbers (having real and imaginary parts), where the real and imaginary parts are used to modulate two carriers at the same frequency, but ninety degrees different in phase.

Traditionally, a signature sequence is used to represent one bit of information. Receiving the transmitted sequence or its complement indicates whether the information bit is a +1 or −1, sometimes denoted "0" or "1". The signature sequence usually comprises N bits, and each bit of the signature sequence is called a "chip". The entire N-chip sequence, or its complement, is referred to as a transmitted symbol. The conventional receiver, e.g., a RAKE receiver, correlates the received signal with the complex conjugate of the known signature sequence to produce a correlation value. After compensation for linear distortion, only the real part of the correlation value is computed. When a large positive correlation results, a "0" is detected; when a large negative correlation results, a "1" is detected.

The "information bits" referred to above can also be coded bits, where the code used is a block or convolutional code. Also, the signature sequence can be much longer than a single transmitted symbol, in which case a subsequence of the signature sequence is used to spread the information bit. In many radio communication systems, the received signal includes two components: an I (in-phase) component and a Q (quadrature) component. In a typical receiver using digital signal processing, the received I and Q component signals are sampled and stored at least every $T_c$ seconds, where $T_c$ is the duration of a chip.

FIG. 1 illustrates the conventional RAKE receiver. The conventional RAKE receiver 100 includes a multipath delay searcher 110, a plurality of parallel demodulators (commonly referred to in the art as RAKE "fingers") 120 and a combiner 130. In general, the RAKE receiver exploits the multipath time delays in a channel and combines delayed replicas of a transmitted signal in order to improve link quality. The RAKE receiver captures most of the received signal energy by allocating a number of parallel demodulators 120 to the selected strongest components of the received multipath signal which are determined by the multipath delay searcher 110. One skilled in the art will appreciate that the multipath delay search processor (commonly referred to in the art as the "searcher") 110 estimates the channel delay profile, identifies paths within the delay profile, and identifies the delay variations due to changing propagation conditions. After the corresponding delay compensation by the RAKE fingers 120, the outputs of all fingers are combined by combiner 130 in order to determine the information content of the signal.

One skilled in the art will appreciate that the searcher of the conventional RAKE receiver consumes a significant portion of the receiver's total power expenditure. Therefore, in order to prolong the battery life of a mobile station into which the RAKE receiver is implemented, it is important to keep the duty-cycle of the searcher as low as possible.

The conventional RAKE receiver fails to consider how quickly the mobile station's environment is changing when performing the searching and demodulation processes. As a result, the duty cycle of the searcher remains constant irrespective of changing environmental conditions, thereby needlessly wasting valuable power.

The present invention recognizes that, by considering the rate of change of the mobile station's environment, the duty cycle of the searcher can be optimized so as to save power. In addition, channel tracking can be improved.

SUMMARY

The present invention seeks to reduce the power consumption of conventional RAKE receivers. In exemplary embodiments of the present invention, the rate of change of the mobile station's environment (reflected in path variations) is determined and routed to the searcher of the RAKE receiver. When, for example, the mobile station's environment is changing quickly, the duty cycle of the searcher is modified so that the search operation is performed more frequently. On the other hand, a slowly changing environment allows for the search operation to be performed less frequently thereby reducing the power consumed by the mobile station.

According to an embodiment of the present invention, a motion detector is implemented in the CDMA mobile station. The motion detector is connected to the searcher and provides an estimate (e.g., very low, low, medium, etc.) of the velocity of the mobile station. In this case velocity of the mobile station can be used as a proxy for the changing environment of the mobile, e.g., as the velocity of the mobile station increases, so does the rate of path variation. The velocity estimate thus allows the duty cycle of the searcher to be optimized, thereby reducing the overall power consumed by the receiver. By also providing the motion estimate to the RAKE fingers, channel estimation tracking is improved.

BRIEF DESCRIPTION OF THE DRAWINGS

The above objects and features of the present invention will be more apparent from the following description of the preferred embodiments with reference to the accompanying drawings, wherein.

DETAILED DESCRIPTION

Figure 1:
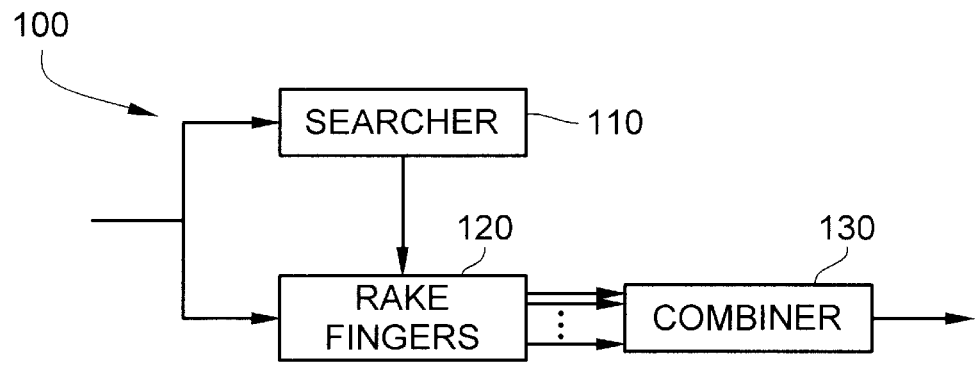
FIG. 1 illustrates a conventional RAKE receiver.
Figure 2:
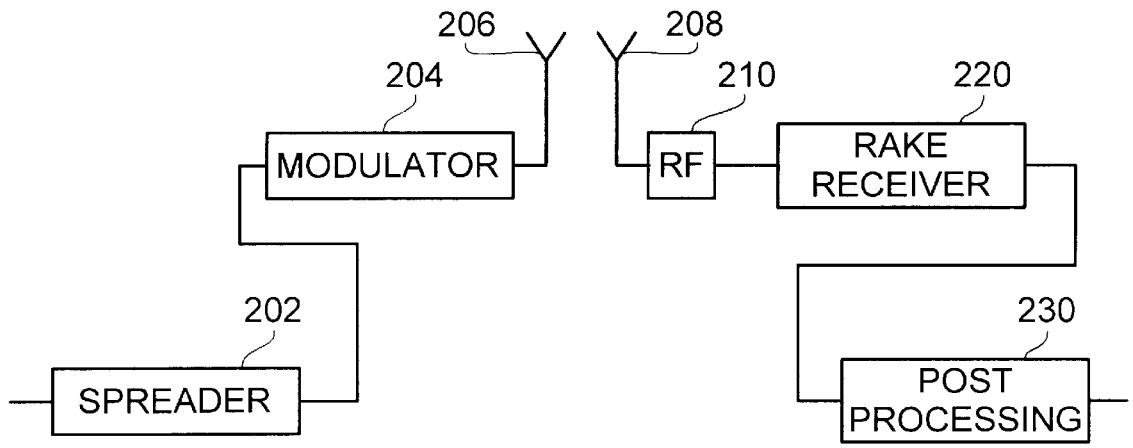
FIG. 2 illustrates an exemplary spread-spectrum communications link.

FIG. 2 illustrates an exemplary spread-spectrum communications link. In FIG. 2, a spreader 202 impresses an informational data stream consisting of information symbols upon a much higher rate data stream known as a signature sequence to generate a spread or transmitted data sequence. In general, this signature sequence may be represented by real and imaginary numbers, corresponding to sending a chip value on the carrier frequency (I channel) or on a 90-degree shifted version of the carrier frequency (Q channel). Also, the signature sequence may be a composite of multiple sequences.

The spread signal is then modulated onto a radio-frequency carrier in modulator 204. The modulated signal is passed to antenna 206 for transmission. At the receiver, receive antenna 208 collects signal energy and passes it to a RF front end 210 which provides the necessary amplification, filtering, and mixing operations to convert the radio signal to a complex, baseband signal consisting of in-phase (I) and quadrature (Q) components as is well known in the art.

The received signal is then passed to a RAKE receiver 220 which isolates and combines individual rays of the received signal, as will be discussed in more detail below. Once combined, the signal is subjected to post processing 230.

In wireless systems, the radio channel gives rise to multipath fading and multipath dispersion, because of signal reflections from, for example, buildings, cars, or nearby mountain ranges. As a result, the signal proceeds to the receiver along not one, but many paths, so that the receiver receives many echoes or rays having different and randomly varying delays and amplitudes. The received signal is then a composite of multiple versions of the transmitted signal that have propagated along different paths having relative time delays.

Figure 3:
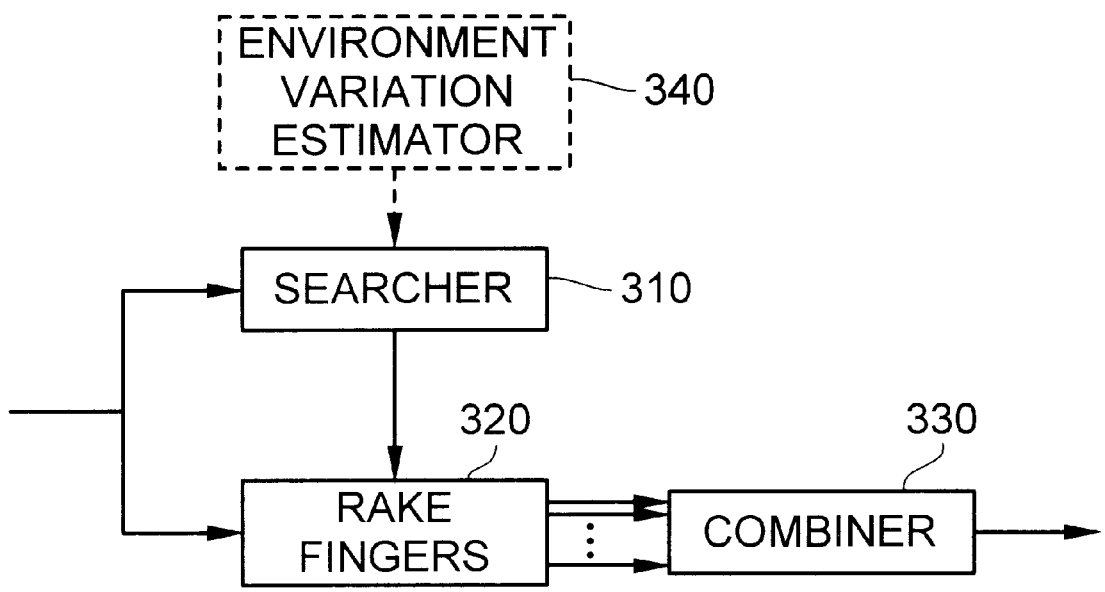
FIG. 3 illustrates a RAKE receiver according to exemplary embodiments of the present invention.

FIG. 3 illustrates a RAKE receiver according to exemplary embodiments of the present invention. Similar to the conventional RAKE receiver, the RAKE receiver according to the present embodiment comprises a searcher 310, a plurality of RAKE fingers 320 and a combiner 330. One skilled in the art will appreciate that the RAKE receiver may alternatively be configured without a separate searcher where one of the plurality of RAKE fingers performs the search operation. The RAKE receiver of the present invention also includes a environment variation estimator 340.

According to exemplary embodiments of the present invention, when the mobile station is receiving a transmitted signal, generally a pilot signal, an estimate of the variation of the mobile station's environment is determined. The environment variation estimator 340 determines the rate at which the mobile station's environment is changing, i.e., the rate at which propagation paths are changing. Such changes can occur due to, for example, movement of the mobile station, or changes in the structures around the mobile, e.g., the closing of elevator doors.

There are a number of methods by which this environment variation estimate may be determined. For example, one skilled in the art will appreciate that a measurement of the frequency offset or the width of the Doppler frequency spectrum will provide a means by which to estimate the variation of the mobile station's environment (i.e., the rate at which the paths are changing). According to a first exemplary embodiment, the frequency offset of each of the RAKE fingers is measured in a well known manner. By comparing the frequency offsets of the different RAKE fingers, an estimate of the variation of the mobile station's environment can then be determined. The frequency offsets of the different RAKE fingers could, alternatively, be compared to the receiver's oscillator frequency in those situations where a reliable oscillator is implemented in the RAKE receiver. Such a comparison would also provide an indication of the rate at which the mobile station's environment is changing.

According to a second exemplary embodiment, the width of the Doppler spectrum on each of the RAKE fingers is determined in a well known manner. The widths are then compared. The finger with the widest Doppler spectrum provides the highest velocity estimate which would indicate the rate at which the environment is changing.

As another alternative, an estimate of the rate at which the mobile station's environment is changing may be made by estimating the velocity of the mobile station. Such an estimation may be made through the use of a plurality of base stations. By transmitting and receiving signals from the base stations to the mobile station, a determination of the mobile station's velocity may be obtained. A fast mobile station velocity may provide an indication of a fast changing environment.

One skilled in the art will appreciate that the above-described methods for estimating the rate at which a mobile station's environment is changing are merely exemplary and that there are many other alternative methods which may be implemented to make such estimations.

Irrespective of the manner in which the estimate is made, the searcher 310 uses this estimate to optimize its duty cycle. For example, when the mobile station's environment is changing at a slow rate, which may be due to the mobile station being stationary or moving at a low velocity, the operation of the searcher, according to the present invention, may be performed less frequently in order to save power. On the other hand, when the environment is changing quickly, the operation of the searcher is performed more frequently in order to improve receiver operation.

Figure 4:
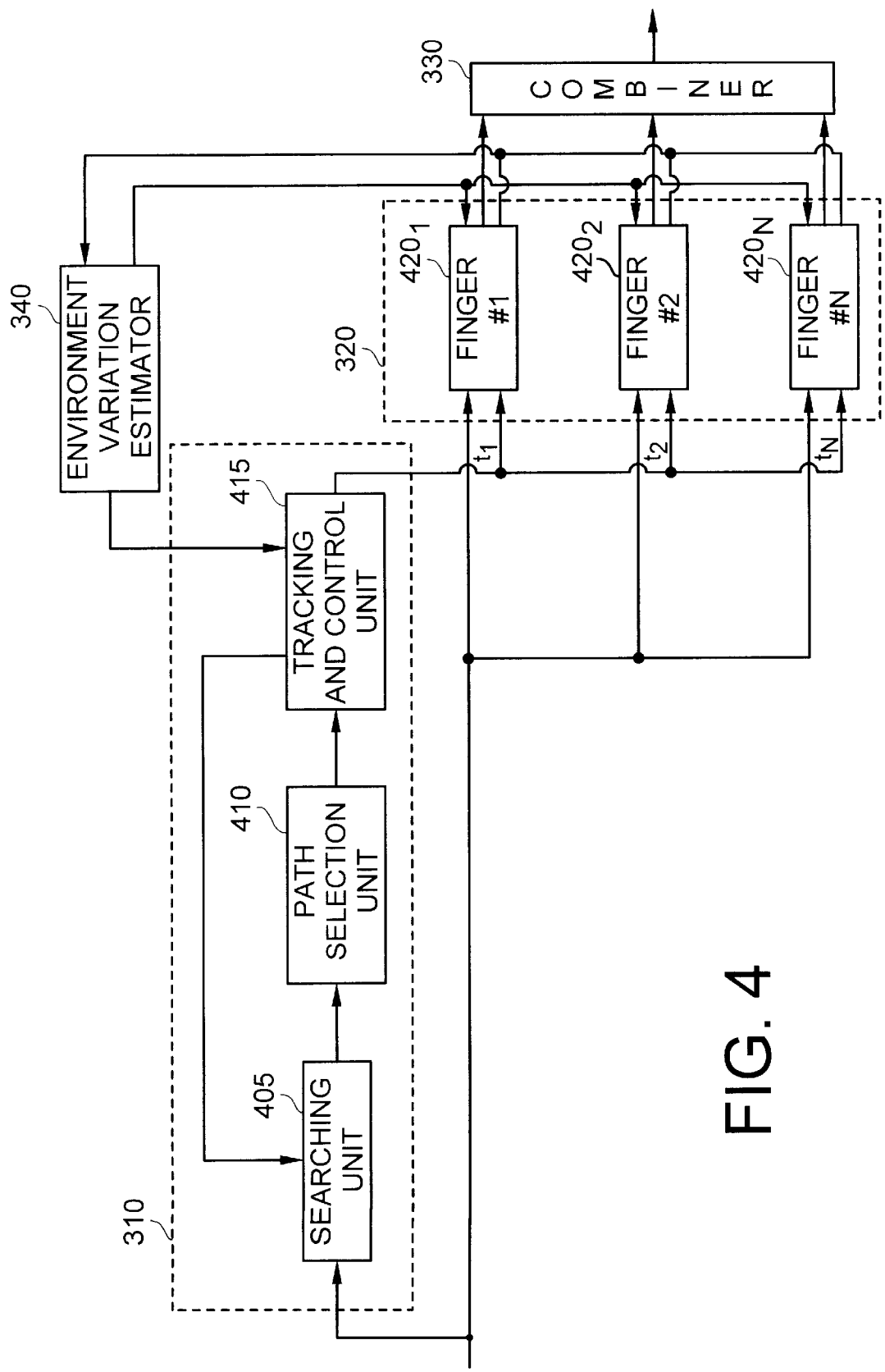
FIG. 4 illustrates the components of the RAKE receiver of the present invention.

FIG. 4 illustrates the RAKE receiver of FIG. 3 in more detail. As illustrated, the searcher 310 includes an exemplary searching unit 405, a path selection unit 410 and a tracking and control unit 415. As an example, the searching unit 405 performs complex correlations using appropriate codes (e.g., short and long Gold codes) on the received composite signal in order to "search" for a desired signal received from the antenna. One skilled in the art will appreciate that the searching unit generally comprises a plurality of matched filters or correlators (not shown) which identifies the M strongest multipath components of the signal intended for decoding by the mobile station from among the various overlaid, spread spectrum signals which are present in the composite signal when received by the mobile's antenna.

The complex correlations are performed by the matched filters (or correlators) over a given time or search window. As a result, the searching unit delivers to the path selection unit 410 a delay power profile (DPP) signal. Although the details of DPP calculation are not particularly relevant to this description, the interested reader is referred to German Application Number DE-19824218.2 "Multipath Searching and Tracking Procedure for a DS-CDMA System with Periodically Inserted Pilot Symbols" filed May 29, 1998, the entirety of which is incorporated here by reference.

Path selection unit 410 extracts the M strongest paths from the DPP received from the searching unit, taking interference estimates into account. Path selection unit 410 then transfers this information to the tracking and control unit 415.

Tracking and control unit 415 performs two primary functions. The first function is to adapt the timing of the searching unit to distance variations between the mobile station and the base station. The second function is to adapt the delivered delay paths according to adjustments of the search window, and to select a certain number of final delay values. The tracking and control unit 415 of the present invention also performs the function of controlling the activation/deactivation frequency of the searching unit 405.

The tracking and control unit 415 outputs timing signals $t_1$–$t_N$ to the different RAKE fingers $420_1$–$420_N$ which indicate delay times in which the RAKE fingers are to demodulate the composite signal. The signals from the individual RAKE fingers $420_1$–$420_N$ are then combined in combiner 330 in accordance with a known diversity technique in order to determine the information content of the signal.

According to exemplary embodiments of the present invention, the environment variation estimator 340 supplies an estimate of the rate of change of the mobile station's environment to the tracking and control unit 415. One skilled in the art will appreciate that the rate of change estimate could be a numerical value or simply a classification (e.g., slow) of how quickly the environment is changing. The tracking and control unit uses the rate of change estimate to control the amount of time in which the matched filters (or correlators) of the searching unit operate (i.e., it controls the activation/deactivation of the matched filters). As a result, the duty cycle of the searcher can be optimized so as to reduce the overall power consumed by the receiver, as well as improve performance of the receiver when the channel conditions are changing rapidly.

As recognized above, it is the searcher, and more particularly, the searching unit of the searcher that consumes a significant portion of the power of the RAKE receiver. Therefore, it is important to keep the duty-cycle of the searching unit as low as possible in order to reduce the overall power consumed by the RAKE receiver.

The conventional RAKE receiver fails to consider the rate at which the mobile station's environment is changing when performing the searching and demodulation processes. As a result, the plurality of matched filters of the searching unit operate at the same rate irrespective of whether the mobile station's environment is slowly changing, where the variation in the multipath rays is small, or changing at a fast speed where the variation of the multipath rays is much larger. In a situation where the environment of the mobile station is slowly changing, the environment variation estimator of the present invention reduces the power consumption of the searcher by minimizing the amount of time that the searcher must operate. Since matched filters are involved in this operation, a large amount of power is saved by reducing their operation. Similarly, when the mobile station environment is changing at a faster pace, the searcher is activated for a longer period of time.

Figure 5:
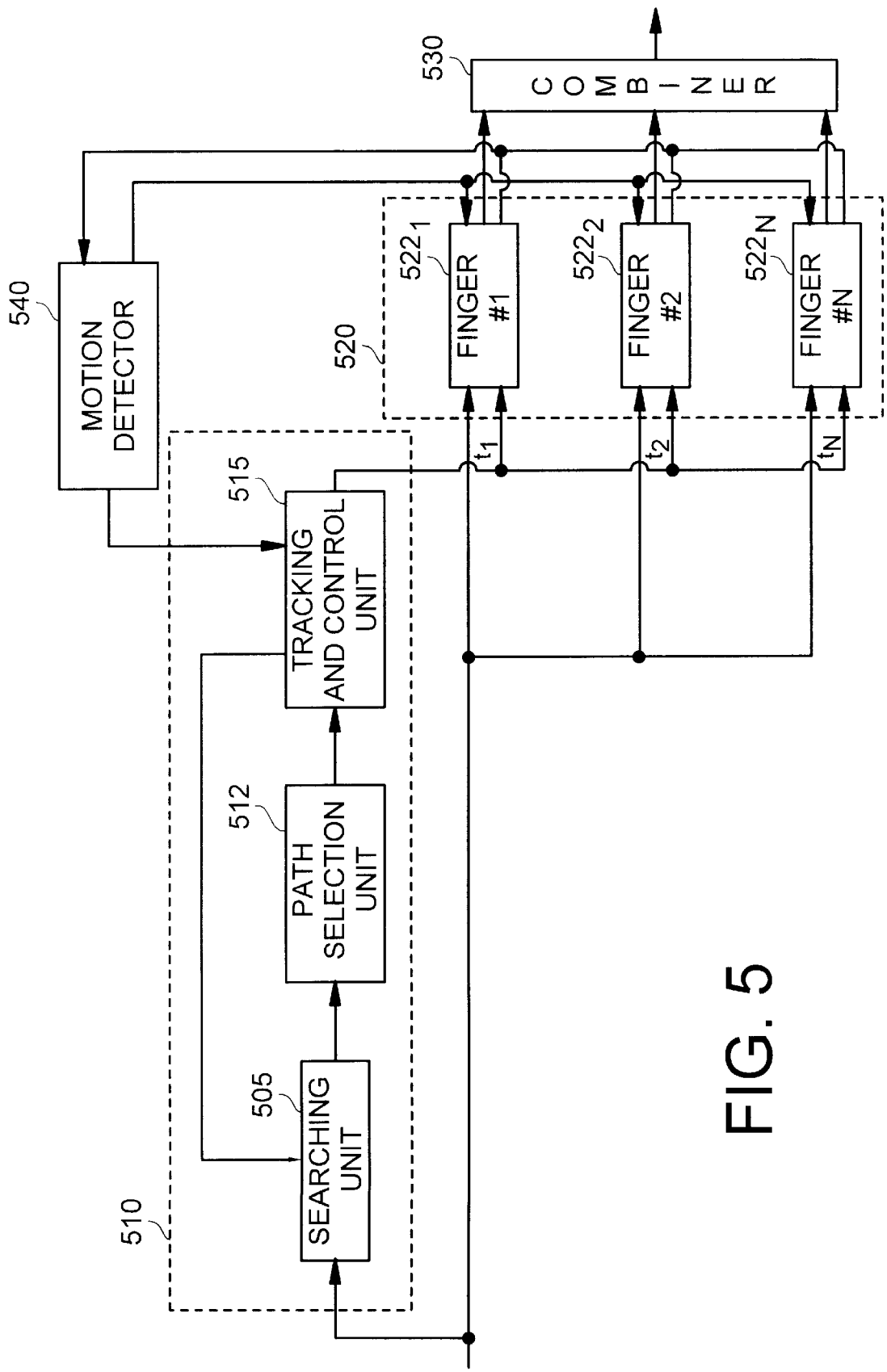
FIG. 5 illustrates the components of the RAKE receiver according to an embodiment of the present invention.

According to an embodiment of the present invention, the environment variation estimator may be implemented as a motion detector. FIG. 5 illustrates a RAKE receiver according to this embodiment of the present invention. The RAKE receiver of FIG. 5 includes a searcher 510, a plurality of RAKE fingers 520 and a combiner 530 which operate in a manner similar to that set forth above with respect to FIG. 4. The RAKE receiver of the present embodiment also comprises a motion detector 540.

When the mobile station is receiving a transmitted signal, an estimate of the mobile station's velocity is determined. This estimate is determined by, for example, estimating the Doppler frequency of the different multipath components, tracking the timing differences of the different multipath components, or by using the Global Positioning System (GPS). When the velocity estimate is determined by estimating the Doppler frequency of the different multipath components, one skilled in the art will appreciate that such an estimation is performed by the RAKE fingers wherein each finger's path variation could be considered individually or, in the alternative, the estimate could be reflective of the majority.

Irrespective of the manner in which the velocity estimate is made, the searcher 310 uses this estimate to optimize its duty cycle. For example, one skilled in the art will appreciate that at low velocities, the variation of the multipath rays is minimal. As will be more apparent below, the minimal variation in the multipath rays allows for the time in which the searcher operates to be minimized. By minimizing the operation of the searcher, a reduction of the power consumed by the mobile station can be achieved. In the alternative, large variations indicate that an increase in searcher performance is warranted.

Similar to the RAKE receiver described above with respect to FIG. 4, the motion detector 540 supplies an estimate of the mobile station's velocity to the tracking and control unit 515. The tracking and control unit 515 uses the velocity estimate to control the amount of time in which the matched filters of the searching unit 505 operate (i.e., it controls the activation/deactivation of the matched filters). As a result, the duty cycle of the searcher 510 can be optimized so as to reduce the overall power consumed by the receiver.

According to an exemplary embodiment of the present invention, the motion detector also provides the velocity estimate to the RAKE fingers. The RAKE fingers perform a channel estimation procedure which involves a filtering operation. One skilled in the art will appreciate that it is difficult to determine the appropriate filter operation to be implemented if the bandwidth of the Doppler frequency is unknown. It is known that the bandwidth of a channel changes in accordance with changes in the mobile station's velocity. Therefore, by providing a velocity estimate to the RAKE fingers, the most appropriate filtering operation may be implemented, resulting in a better channel estimate.

One skilled in the art will appreciate that, in most instances, it is sufficient to use a simple classification of the speed, e.g. low and high, as opposed to determining an actual numerical value. As a result, a much more simple motion detector can be employed. One skilled in the art will also appreciate that additional categories (in addition to low and high) may be included without departing from the spirit and scope of the invention. For example, the velocity categories could be broken down into very low, low, medium, high and very high.

This present invention relates to all areas of digital communication using CDMA. The present invention provides a method for reducing power consumption and improving performance. Although the method embodying the invention is particularly suitable for mobile stations in cellular communication systems, its application is not so limited. For example, the present invention could also be used in base stations.

Moreover, while the above-described embodiments set forth that a motion detector may be implemented in a mobile station for providing an estimate of the rate at which the mobile station's environment is changing, one skilled in the art will appreciate that a separate motion detector and environment variation estimator may be employed in order to better determine the optimum duty cycle at which the searcher is to operate. For example, there may be instances where the mobile station is moving at a low velocity or is stationary, but the environment is changing at a fast rate due to changes in the structures around the mobile station. In such a situation, the environment variation estimator would ensure that an optimum duty cycle is determined.

The foregoing has described the principles, preferred embodiments and modes of operation of the present invention. However, the invention should not be construed as being limited to the particular embodiments discussed above. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A receiver comprising:
    a searcher for detecting rays of a received spread spectrum signal;
    a plurality of demodulation elements for demodulating selected rays identified by said searcher and estimating a channel associated with the rays;
    a combiner for combining outputs of said plurality of demodulation elements; and
    a motion detector for estimating a velocity of said receiver,
    wherein said receiver uses said estimated velocity to adjust operation of said searcher.

2. The system of claim 1 wherein said velocity estimate is a numerical value.

3. The system of claim 1 wherein said velocity estimate is a classification of said velocity.

4. The system of claim 1 wherein said demodulation elements use said velocity estimate in order to improve channel estimation tracking.

5. The system of claim 1 wherein said velocity estimate is used to control the activation/deactivation frequency of said searcher.

6. A method for processing a received signal in a mobile station comprising the steps of:
    estimating a velocity of the mobile station;
    activating a searcher for searching for multipath rays in said received signal; and
    processing said received signals using paths identified in said searching step,
    wherein an activation/deactivation frequency of said searcher is varied based upon the velocity estimate.

7. The method of claim 6 wherein a frequency of operation of said searcher decreases as the velocity decreases.

8. The method of claim 6 wherein the velocity estimate is a numerical value.

9. The method of claim 6 wherein the velocity estimate is a classification of said velocity.

10. The method of claim 6 wherein said step of processing further comprising the steps of:

demodulating paths selected by said searcher; and combining said demodulated paths, wherein said velocity estimate improves said demodulating step by improving channel tracking.

11. The method of claim 6 wherein said velocity estimate provides an indication of a rate at which an environment of said mobile station is changing.

12. A system for processing a received signal in a mobile station comprising:

a searching unit for searching for multipath rays in said received signal;

a motion detector for estimating a velocity of said mobile station;

means for activating/deactivating said searching unit in response to said velocity estimate; and means for processing said received signal using paths identified in said searching step.

13. The system of claim 12 wherein a frequency of operation of said searcher decreases as a result of a decrease in velocity.

14. The system of claim 12 wherein said means for processing comprising:

a plurality of demodulating elements for demodulating paths selected by said searcher; and a combiner for combining said demodulated paths, wherein the velocity estimate improves channel tracking and path demodulation by said demodulating elements.

15. The system of claim 12 wherein the velocity estimate is a numerical value.

16. The system of claim 12 wherein the velocity estimate is a classification of said velocity.

17. The system of claim 12 further comprising:

an environment variation estimator for estimating a rate of change of an environment of the mobile station, wherein said means for activating/deactivating said searching unit is responsive to both said velocity estimate and said rate of change estimate.

18. A method for processing a received signal in a mobile station comprising the steps of:

estimating a rate of change of an environment of the mobile station;

activating a searcher for searching for multipath rays in said received signal; and processing said received signal using paths identified in said searching step, wherein an activation/deactivation frequency of said searcher is varied based on the rate of change estimate.

19. The method of claim 18 wherein said step of estimating a rate of change comprises the step of determining a rate at which paths are changing.

20. The method of claim 18 wherein said step of estimating a rate of change comprises the step of estimating a velocity of said mobile station.

21. The method of claim 20 wherein said velocity estimate is made through by using a plurality of base stations.

22. The method of claim 18 wherein said step of processing further comprising the steps of:

demodulating paths selected by said searcher; and combining said demodulated paths, wherein said rate of change estimate improves said demodulating step by improving channel tracking.

23. The method of claim 18 further comprising the step of:

estimating a velocity of the mobile station, wherein said activation/deactivation frequency is varied based on both said rate of change estimate and said velocity estimate.

24. A system for processing a received signal in a mobile station comprising:

a searching unit for searching for multipath rays in said received signal;

an environment variation estimator for estimating a rate of change of an environment of the mobile station;

means for activating/deactivating said searching unit in response to said environment variation estimate; and means for processing said received signal using paths identified in said searching steps.

25. The system of claim 24 wherein said environment variation estimator is means for determining a rate at which paths are changing.

26. The system of claim 24 wherein said environment variation estimator is a motion detector for estimating a velocity of said mobile station.

27. The system of claim 24 wherein said means for processing comprising:

a plurality of demodulating elements for demodulating paths selected by said searcher; and a combiner for combining said demodulated paths, wherein the rate of change estimate improves channel tracking and path demodulation by said demodulating elements.

* * * * *